United States Patent
Ueno et al.

[19]

[11] Patent Number: 5,773,482
[45] Date of Patent: Jun. 30, 1998

US005773482A

[54] THERMAL INSULATING FOAMED MATERIAL, METHOD FOR PRODUCING THE SAME, AND THERMAL INSULATING CABINET

[75] Inventors: Takayoshi Ueno, Katano; Takashi Hashida; Masaaki Suzuki, both of Osaka; Fumihiro Inagaki, Otokuni-gun; Nobuo Sonoda, Settsu; Hideo Nakamoto, Osaka; Tomohisa Tenra, Yao; Tsukasa Takushima, Higashiosaka; Yoshio Kishimoto, Hirakata, all of Japan

[73] Assignees: Matsushita Electric Industrial Co., Ltd.; Matsushita Refrigeration Company, both of Osaka, Japan

[21] Appl. No.: 809,959

[22] PCT Filed: Aug. 26, 1996

[86] PCT No.: PCT/JP96/02386

§ 371 Date: May 22, 1997

§ 102(e) Date: May 22, 1997

[87] PCT Pub. No.: WO97/09361

PCT Pub. Date: Mar. 13, 1997

[30] Foreign Application Priority Data

Sep. 1, 1995 [JP] Japan .................................. 7-225486
Dec. 19, 1995 [JP] Japan .................................. 7-329998

[51] Int. Cl.⁶ ........................................................ C08G 18/00
[52] U.S. Cl. .............................. 521/99; 521/114; 521/130
[58] Field of Search ............................. 521/99, 114, 130

[56] References Cited

U.S. PATENT DOCUMENTS 4,578,452  3/1986  Kleeberg .
5,256,726  10/1993 Müller et al. ............................ 521/156
5,389,695  2/1995  Jaster et al. .............................. 521/97
5,464,949  11/1995 Markovitz .
5,567,739  10/1996 Ward, III ................................ 521/130

FOREIGN PATENT DOCUMENTS

| 49-38951-A | 4/1974 | Japan . |
| 49-51394-A | 5/1974 | Japan . |
| 49-73498-A | 7/1974 | Japan . |
| 5-194780-A | 8/1993 | Japan . |
| 6-220239-A | 8/1994 | Japan . |
| 7-53757-A | 2/1995 | Japan . |
| 7-173314-A | 7/1995 | Japan . |
| 8-127666-A | 5/1996 | Japan . |

*Primary Examiner*—Morton Foelak
*Attorney, Agent, or Firm*—Panitch Schwarze Jacobs & Nadel, P.C.

[57] ABSTRACT

There are disclosed a thermal insulating foamed material, which is superior in thermal insulating property and does not cause deterioration of the thermal insulating property with a time lapse, and a method for producing the same. According to a method for producing a thermal insulating foamed material, a foamed polyurethane resin composition having closed cells, in which at least carbon dioxide is filled, is formed by blowing a raw material mixture containing epoxides comprising at least two members of an epoxide compound having high reactivity with carbon dioxide and an epoxide compound having low reactivity with carbon dioxide, a carbon dioxide fixation catalyst, polyisocyanate, a reactive blowing agent which evolves carbon dioxide by reacting with said polyisocyanate, and a polyol composition. Then, the carbon dioxide in the closed cells is allowed to react with the epoxides in the presence of the carbon dioxide fixation catalyst, thereby to fix carbon dioxide as carbonate compounds.

26 Claims, 2 Drawing Sheets

THERMAL INSULATING FOAMED MATERIAL, METHOD FOR PRODUCING THE SAME, AND THERMAL INSULATING CABINET

TECHNICAL FIELD

The present invention relates to a thermal insulating foamed material which is used for a refrigerator, freezer and the like, a method for producing the same, and a thermal insulating cabinet filled with the thermal insulating foamed material.

BACKGROUND ART

A thermal insulating foamed material of a foamed urethane resin wherein a blowing is performed by evaporating a blowing agent in the reaction process has hitherto been produced by mixing a polyol composition containing a blowing agent, a foam stabilizer and an urethane reaction catalyst with polyisocyanate with stirring.

Recently, environmental pollution or disruption such as depletion of ozone layer or global warming by chlorofluorocarbons (hereinafter abbreviated to "CFC") or hydrochlorofluorocarbons (hereinafter abbreviated to "HCFC") has been a social problem, and thus a reduction in or a complete abolishment of the use of specific CFC substances such as trichloromonofluoromethane (CFC-11), which is a blowing agent, has been contemplated. Therefore, a substance almost free from environmental pollution or disruption, for example, 1,1-dichloro-1-fluoroethane (HCFC-141b), 1,1-dichloro-2,2,2-trifluoroethane (HCFC-123) and hydrocarbon (hereinafter abbreviated to "HC") such as cyclopentane has been used as the blowing agent. However, a reduction in amount of HCFC used has been proceeded because HCFC has an ozone depletion coefficient. A HC blowing agent has a vapor thermal conductivity larger than that of conventional CFC-11, thereby to increase a thermal conductivity of the resultant polyurethane foamed material.

When the polyurethane foamed material is produced using the above-mentioned compound as a volatile blowing agent, water is used as a reactive blowing agent for the purpose of improving the blowing efficiency, in addition to the volatile blowing agent. In that case, carbon dioxide produced by the reaction between water and polyisocyanate exists in the closed cells of the polyurethane foamed material, in addition to a vapor of the volatile blowing agent. That is, water added reacts with an isocyanate group and the volatile blowing agent is evaporated by reaction heat, thereby to perform blowing. In addition, blowing is also performed by carbon dioxide evolving as a result of reaction between water and the isocyanate group. Even if water is not added, carbon dioxide evolves by the carbodiimide reaction wherein a part of isocyanate groups reacts with each other. However, the vapor thermal conductivity of carbon dioxide is generally higher than that of the volatile blowing agent. Therefore, there is a problem that carbon dioxide exists in the closed cells and a thermal insulating property of the polyurethane foamed material is deteriorated when a ratio of carbon dioxide in vapor increases.

In order to improve the thermal insulating property of the polyurethane foamed material, a trial of decreasing the proportion of carbon dioxide in the closed cells has hitherto been made. There is a proposal to improve the thermal insulating property of the polyurethane foamed material by fixing carbon dioxide having a poor thermal insulating property, which exists in the closed cells (Japanese Laid-Open Patent Publication Nos. Hei 7-53757 and Hei 7-173314). When using this technique, only carbon dioxide exists in the closed cells in the case of using water alone as the blowing agent and the inside of the closed cells becomes a vacuum state by fixing this carbon dioxide, thereby to improve the thermal insulating property. When using a volatile blowing agent having a low vapor thermal conductivity, the closed cells are filled with carbon dioxide, produced by the reaction between water added and the isocyanate group or carbodiimide reaction, and a vapor of the volatile blowing agent as mentioned above. Then, only the vapor of the volatile blowing agent having a low vapor thermal conductivity remains in the closed cells by fixing carbon dioxide, thereby to improve the thermal insulating property.

For example, in the proposal by Japanese Laid-Open Patent Publication No. Hei 7-173314, an epoxide compound and an addition reaction catalyst are previously added to a blowing stock solution and, after forming a foamed thermal insulating material, the epoxide compound reacts with carbon dioxide to form a cyclic carbonate compound, thereby to fix carbon dioxide. It is characterized in that the partial pressure of carbon dioxide inside the closed cells is reduced by this to reduce the vapor thermal conductivity, thereby to improve a thermal insulating property.

In the polyurethane foamed material, a primary reaction between water and polyisocyanate and that between polyol and polyisocyanate generally proceed at the blowing stage. After forming the foamed material, polyisocyanate and water partially remain sometimes. Therefore, the between water and the isocyanate group or carbodiimide reaction wherein the isocyanate groups react with each other occur gradually with a time lapse and carbon dioxide evolves and gradually increases a ratio of carbon dioxide in the closed cells, thereby to deteriorate the thermal insulating property with a time lapse sometimes. In the foamed thermal insulating material whose thermal insulating property is improved by fixing carbon dioxide to reduce the partial pressure of carbon dioxide, as shown in the construction of the above-mentioned proposal, a change in partial pressure due to evolution of carbon dioxide with a time lapse is particularly large. Therefore, there arose a problem that an increase in thermal conductivity becomes remarkable, thereby to drastically deteriorate the thermal insulating property.

In the construction of the above-mentioned proposal, the primary reaction between water and the isocyanate group and that between polyol and polyisocyanate proceed at the blowing stage and, at the same time, side reactions such as polymerization of the epoxide compound and polyisocyanate, polymerization of the epoxide compound and polyol, polymerization of the epoxide compounds, etc. proceed competitively. The reaction between the epoxide compound and polyisocyanate is exclusive as the primary side reaction, and the epoxide compound partially serves as a curing agent of a foamed urethane resin composition, which becomes a part of the resin component. Accordingly, the resin component of the resultant polyurethane foamed material has a structure wherein a urethane resin and an epoxy resin are combined with each other. Therefore, when epoxide compounds having a small amount of functional groups become a part of the resin component due to the side reaction thereof, a resin thermal conductivity of the thermal insulating foamed material becomes high by exerting an influence thereof. Even if carbon dioxide is removed by fixation, a reduction effect of the vapor thermal conductivity is not sufficiently exhibited sometimes. On the other hand, it is also considered to use a polyfunctional epoxy resin raw material having a comparatively large molecular weight as the epoxide compound, as a means for inhibiting the resin thermal conductivity from increasing. However, it is assumed that the vapor thermal conductivity can not be sufficiently reduced because a fixation property of carbon dioxide is deteriorated.

Furthermore, an activity of the reaction between the epoxide compound and polyisocyanate which is the above-mentioned main side reaction is comparatively lower than that of the reaction between polyol and polyisocyanate, which is the primary reaction. Therefore, a rate of curing due to the reaction between the epoxide compound and polyisocyanate becomes slow. In the case of the epoxide compound having a small amount of functional groups, a productivity is drastically lowered sometimes, by delayed development of a mechanical strength of the polyurethane foamed material or extension of time up to the time of removing from the mold.

Accordingly, it is required to improve the thermal conductivity of the polyurethane foamed material by rapidly fixing carbon dioxide inside the closed cells with the residual epoxide compound without increasing the thermal conductivity of the resin in the polyurethane foamed material due to an inclusion of the above-mentioned side reaction product. It is also required to improve the thermal conductivity of the polyurethane foamed material by allowing the residual epoxy group to react with carbon dioxide in the closed cells and carbon dioxide evolving with a time lapse even if the epoxide component becomes the resin component.

Under these circumstances, an object of the present invention is to provide a thermal insulating foamed material comprising a foamed urethane resin composition which is superior in thermal insulating property.

Another object of the present invention is to provide a method for producing a thermal insulating foamed material having an improved thermal insulating property, which can rapidly develop a mechanical strength of the resin and is superior in productivity.

DISCLOSURE OF INVENTION

The above-mentioned object of the present invention is accomplished by using at least two members of an epoxide compound having high reactivity with carbon dioxide and an epoxide compound having low reactivity with carbon dioxide, as epoxides for fixing carbon dioxide.

According to the present invention, a method for producing a thermal insulating foamed material comprises the steps of:

blowing a raw material mixture containing epoxides comprising at least two members of an epoxide compound having high reactivity with carbon dioxide and an epoxide compound having low reactivity with carbon dioxide, a carbon dioxide fixation catalyst, polyisocyanate, a reactive blowing agent which evolves carbon dioxide by reacting with the polyisocyanate, and a polyol composition, thereby to form a foamed polyurethane resin composition having closed cells in which at least carbon dioxide is filled, and allowing the carbon dioxide in the closed cells to react with the epoxides in the presence of the carbon dioxide fixation catalyst, thereby to fix the carbon dioxide as carbonate compounds.

As the reactive blowing agent, for example, water, hydrogen peroxide, and a lower carboxylic acid such as formic acid are used.

The thermal insulating foamed material of the present invention comprises a foamed urethane resin composition having closed cells, the foamed urethane resin composition containing a carbon dioxide fixation catalyst and cyclic carbonate compounds as products of reactions between carbon dioxide and epoxides in the presence of the carbon dioxide fixation catalyst, the cyclic carbonate compounds comprising at least two members of a product of an epoxide compound having high reactivity with carbon dioxide and carbon dioxide and a reaction product of an epoxide compound having low reactivity with carbon dioxide and carbon dioxide.

In one preferred embodiment of the present invention, the epoxide compound having high reactivity with carbon dioxide is an epoxide complex in which the carbon dioxide fixation catalyst is coordinated to an oxirane ring.

This epoxide complex is produced by combining the epoxide compound with the carbon dioxide fixation catalyst. That is, examples thereof include an epoxide complex in which a nucleophile is coordinated to carbon of an oxirane ring, an epoxide complex in which an electrophile is coordinated to oxygen of an oxirane ring, an epoxide complex in which a nucleophile is coordinated to carbon of an oxirane ring and an electrophile is coordinated to oxygen of an oxirane ring and the like.

Regarding the epoxide complex used herein, it is preferred that the amount of the epoxy group is from 0.01 to 1.0 mol per mol of the epoxy group of the epoxide compound having low reactivity with carbon dioxide.

In another embodiment of the present invention, the epoxide compound having high reactivity with carbon dioxide is an epoxide complex in which the carbon dioxide fixation catalyst is coordinated to an oxirane ring, and the epoxide compound having low reactivity with carbon dioxide is an alkylene oxide.

In still another embodiment of the present invention, the epoxide compound having high reactivity with carbon dioxide is an epoxide complex in which the carbon dioxide fixation catalyst is coordinated to an alkylene oxide, and the epoxide compound having low reactivity with carbon dioxide comprises an alkylene oxide and a glycidyl ether.

The preferable epoxides used in the present invention contain an epoxide compound having high reactivity with polyisocyanate and an epoxide compound having low reactivity with polyisocyanate, and the epoxide compound having low reactivity with carbon dioxide is an epoxide compound having high reactivity with polyisocyanate.

It is preferred that the amount of the epoxy group of the epoxide compound having high reactivity with polyisocyanate is from 0.50 to 2.0 mol per mol of the epoxy group of the epoxide compound having low reactivity with polyisocyanate.

A specific construction of the above-mentioned epoxides with defined reactivity with polyisocyanate will be shown below.

First, the epoxide compound having high reactivity with polyisocyanate is a polyglycidyl ether having two or more epoxy groups, and the epoxide compound having low reactivity with polyisocyanate is a monoglycidyl ether having one epoxy group.

Second, the epoxide compound having high reactivity with polyisocyanate is a polyglycidyl ether having at least one hydroxyl group, and the epoxide compound having low reactivity with polyisocyanate is a glycidyl ether having no hydroxyl group.

Third, the epoxide compound having high reactivity with polyisocyanate is a polyglycidylamine, and the epoxide compound having low reactivity with polyisocyanate is a glycidyl ether.

The preferable epoxides used in the present invention contain an epoxide compound having a boiling point of more than 120° C. and an epoxide compound having low reactivity with polyisocyanate and a boiling point of 120° C. or less, and the epoxide compound having low reactivity with carbon dioxide is an epoxide compound having low reactivity with polyisocyanate.

It is preferred that the amount of the epoxy group of the epoxide compound having a boiling point of more than 120° C. is from 0.20 to 2.0 mol per mol of the epoxy group of the epoxide compound having a boiling point of 120° C. or less.

More preferably, the epoxide compound having a boiling point of more than 120° C. is a glycidyl ether, a glycidyl ester or a glycidylamine, and the epoxide compound having a boiling point alkylene 120° C. or less is an alkylene oxide.

In the preferred method for producing the thermal insulating foamed material of the present invention, a volatile blowing agent is added to a raw material mixture.

In the method for producing the thermal insulating foamed material of the present invention, the amount of epoxides added for fixing carbon dioxide is the amount having the epoxy group in an amount preferably from 1 to 6 mol, more preferably from 1.5 to 4 mol, per mol of carbon dioxide evolving as a result of the reaction between the reactive blowing agent and polyisocyanate.

It is preferred that the polyisocyanate has an isocyanate group whose molar amount is the same as that of a hydroxyl group in the raw material mixture, and has an isocyanate group which reacts with 0 to 50% of the epoxy group of the epoxide.

BEST MODE FOR CARRYING THE INVENTION

The preferred embodiments of the present invention will be explained in more detail hereinafter.

Figure 1:
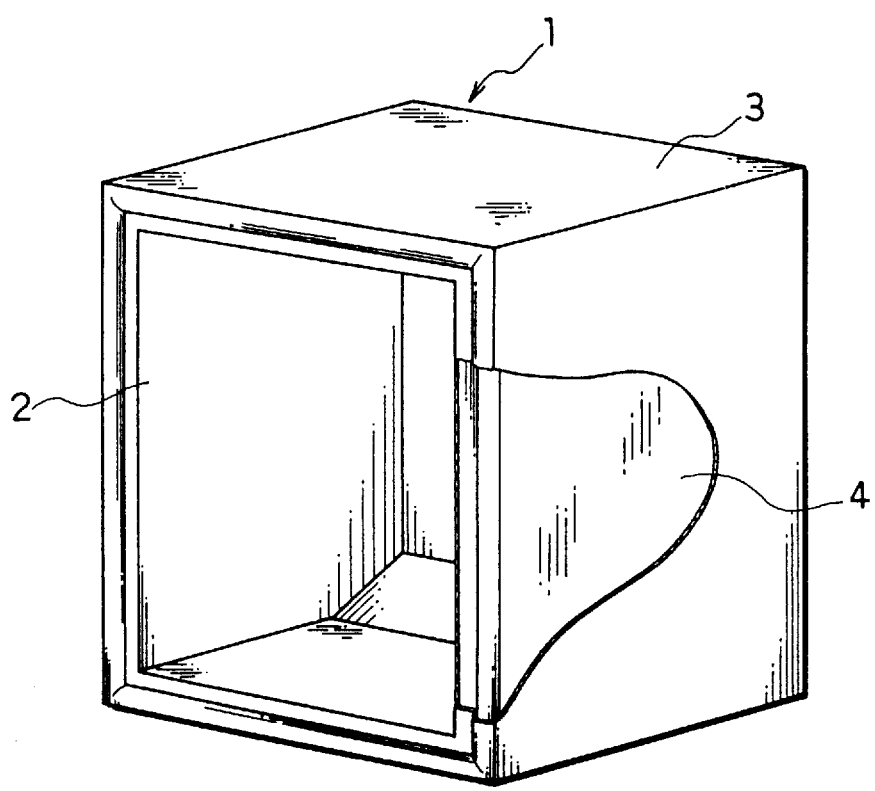
FIG. 1 is a partially sectioned perspective view showing a thermal insulating cabinet of one embodiment in accordance with the present invention.

FIG. 1 shows a thermal insulating cabinet with a thermal insulating foamed material of the present invention. Regarding the thermal insulating cabinet 1, the space part formed by an inner liner 2 made of an ABS resin and an outer shell 3 made of iron is filled with the thermal insulating foamed material 4 comprising a foamed urethane resin composition of the present invention.

This thermal insulating foamed material 4 is produced as follows. That is, a foamed polyurethane resin composition having the closed cells which contain at least carbon dioxide, is formed by injecting a raw material mixture containing polyisocyanate, polyol, a reactive blowing agent which evolves carbon dioxide by reacting with the polyisocyanate, a foam stabilizer, a urethane reaction catalyst, the above-mentioned epoxides and a carbon dioxide reaction catalyst into a space part formed by an inner liner 2 and an outer shell 3, followed by blowing. Then, carbon dioxide in the closed cells is allowed to react with the epoxides in the presence of carbon dioxide fixation catalyst, thereby to fix the carbon dioxide as carbonate compounds.

In the present invention, since at least two members of epoxide compounds of an epoxide compound having high reactivity with carbon dioxide and an epoxide compound having low reactivity with carbon dioxide are used as epoxides, cyclic carbonate compounds as products of reactions between carbon dioxide and epoxides comprise at least two members of a reaction product of an epoxide compound having high reactivity with carbon dioxide and carbon dioxide and a reaction product of an epoxide compound having low reactivity with carbon dioxide and carbon dioxide.

These reactions between epoxides and carbon dioxide will be explained in more detail. First, carbon dioxide, which rapidly evolves at the time of formation of a foamed material and exists in the closed cells of the foamed material, is fixed by a rapid addition reaction with the epoxide compound having high reactivity with carbon dioxide in the presence of the carbon dioxide fixation catalyst, thereby to reduce the partial pressure of carbon dioxide in the closed cells. Since a volatile blowing agent having an excellent thermal insulating property is normally used in combination with a reactive blowing agents as the blowing agent, a ratio of vapor of this volatile blowing agent in the closed cells increases as carbon dioxide is reduced and improves the thermal insulating property. The fixation of carbon dioxide evolving gradually from the resin composition with a time lapse proceeds due to the epoxy compound having low reactivity with carbon dioxide. That is, one of conventional problems is solved by allotting each role of carbon dioxide fixation to a plurality of epoxide compounds having different reactivity with carbon dioxide.

The addition reactions for fixing carbon dioxide using these epoxide compounds are reactions wherein carbon dioxide and epoxides form cyclic carbonates, as shown in the following formula (1). These reactions easily proceed at normal temperature under normal pressure in the presence of the carbon dioxide fixation catalyst.

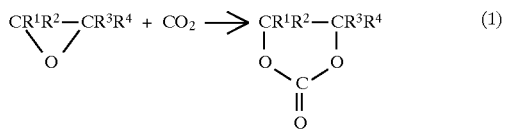

(1)

In the formula (1), $R^1$, $R^2$, $R^3$ and $R^4$ represent a hydrogen atom or a substituent. Although epoxides are represented by a 3-membered ring ether, the same reaction occurs in the case of 4-membered or larger ring ether.

Carbon dioxide, which exists in the closed cells of the thermal insulating foamed material, evolves during the production of the foamed urethane resin composition. Carbon dioxide evolves as a result of the carbodiimide reaction of polyisocyanate as the raw material or evolves as a result of the reaction between the reactive blowing agent such as water contained in the polyol composition and polyisocyanate, and plays a role in forming the closed cells by blowing.

Materials used for producing a normal foamed urethane resin can be applied to polyol and polyisocyanate used in the production method of the present invention. A polyol composition is normally prepared by adding a blowing agent, a foam stabilizer, a urethane reaction catalyst and the like to polyol. Normally used materials can be applied for the foam stabilizer and urethane reaction catalyst. Since the carbon dioxide fixation catalyst itself sometimes serves as the urethane reaction catalyst, it is necessary to appropriately adjust the amount of the urethane reaction catalyst added. If necessary, a flame retardant is sometimes added.

The blowing agent used in the present invention is at least a reactive blowing agent, and it is preferred to use a volatile blowing agent in combination.

As the volatile blowing agent, a volatile organic liquid is used. This blowing agent is vaporized by reaction heat generated by the reaction between polyol and polyisocyanate, thereby to form the closed cells in the resultant polyurethane composition. In order to form the closed cells and to make a diameter of the closed cells uniform and fine, the boiling point of the volatile organic liquid is preferably within the range from 20 to 100° C. Specifically, there are hydrocarbon blowing agent such as cyclopentane, n-pentane and the like; hydrochlorofluorocarbon blowing agent such as HCFC-141b, HCFC-123 and the like; or hydrofluorocarbon blowing agent such as HFC-356mmf, HFC-245fa and the like. As these volatile blowing agents, those having a vapor thermal conductivity which is considerably lower than that of carbon dioxide are selected. They can be used alone or in combination.

As the reactive blowing agent, compounds which evolves carbon dioxide by the reaction between the reactive blowing agent and polyisocyanate, such as water, hydrogen peroxide, lower carboxylic acid and the like may be used. For example, water reacts with an isocyanate group and evolves carbon dioxide, thereby to form the closed cells. It is particularly effective when blowing of the volatile organic liquid is not sufficient. That is, water added reacts with polyisocyanate and the volatile organic liquid is liable to be vaporized by reaction heat. Carbon dioxide evolving as a result of the reaction between water and polyisocyanate assists blowing. Even if the reactive blowing agent is not used, carbon dioxide evolves by the carbodiimide reaction which occurs between the isocyanate groups.

Regarding the amount of epoxides added for fixing carbon dioxide, it is preferred to have an epoxy group in the amount of 1 to 6 mol per mol of a stoichiometric amount of carbon dioxide evolving by the reaction between the reactive blowing agent and polyisocyanate. That is, when the amount is less than 1 mol, it becomes impossible to retain the epoxy group enough to fix carbon dioxide remaining inside the closed cells of the formed thermal insulating foamed material under the conditions at which the side reaction between the epoxide compound and polyisocyanate occurs. Therefore, an effect enough to improve the thermal insulating property can not be obtained. Furthermore, it also becomes impossible to remove carbon dioxide which evolves with a time lapse. When the amount exceeds 6 mol, the amount of the product of the side reaction between the epoxide compound and polyisocyanate increases too much and, therefore, the thermal conductivity of the resin part of the foamed material is liable to increase. Even if the side reaction product can be sufficiently inhibited, the amount of the residual liquid epoxy resin becomes too large and, therefore, productivity is drastically lowered sometimes by delayed development of a mechanical strength of the polyurethane foamed material or an extension of time up to the time of mold releasing.

It is possible to use epoxides and the carbon dioxide by mixing them with the polyol composition or polyisocyanate. It is also possible to use a method of preparing epoxides or a carbon dioxide fixation catalyst as a third component, in addition to the polyol and polyisocyanate, and mixing them with the polyol composition and polyisocyanate at the time of blowing.

It is preferred that polyisocyanate used in the present invention has an isocyanate group in the same amount as that of a hydroxyl group in the raw material, and has an isocyanate group which reacts with 0 to 50% of an epoxy group of epoxides. According to this construction, it becomes possible to rapidly develop the mechanical strength of the thermal insulating foamed material without leaving the unreacted epoxy group of the required amount or more. It is also possible to retain an epoxy group required for fixing carbon dioxide which exists inside the closed cells after forming the foamed material. When the amount of polyisocyanate is an amount at which polyisocyanate reacts with more than 50% of epoxy groups of epoxides, not only the side reaction is liable to increase but also the remaining amount of the isocyanate group is liable to increase. Therefore, the amount of carbon dioxide evolving with a time lapse increases.

Regarding epoxides used in the production method of the present invention, it is preferred that the epoxide compound having high reactivity with carbon dioxide is an epoxide complex in which the carbon dioxide fixation catalyst is coordinated to an oxirane ring. A particularly preferred effect can be obtained when the amount of the epoxy group of this epoxide complex is from 0.01 to 1.0 mol per mol of the epoxy group of the epoxide compound having low reactivity with carbon dioxide. That is, when using the epoxide complex, carbon dioxide fixation proceeds efficiently and, at the same time, it also becomes possible to efficiently fix carbon dioxide with respect to the epoxide compound having low reactivity with carbon dioxide, as mentioned above. Furthermore, since this epoxide complex has a comparatively low activity with polyol or polyisocyanate, the side reaction can be inhibited. Therefore, the amount of the epoxide complex added to the epoxide compound having low reactivity with carbon dioxide may be made small and it is not necessary to add an excess epoxide complex. The amount of the above epoxy group within the range from 0.01 to 1.0 is suitable, but is not limited to this range.

An excellent effect can be obtained when epoxides used in the production method of the present invention contain an epoxide compound having high reactivity with polyisocyanate and an epoxide compound having low reactivity with polyisocyanate, and the epoxide compound having low reactivity with carbon dioxide is an epoxide compound having high reactivity with polyisocyanate. In this case, when a ratio of the amount of the epoxy group of the epoxide compound having high reactivity with polyisocyanate to the amount of the epoxy group of the epoxide compound having low reactivity with polyisocyanate is from 0.5 to 2.0, a particularly preferred effect can be obtained. That is, when the above ratio is less than 0.5, almost all of the epoxide compound having high reactivity with polyisocyanate is converted into a urethane resin composition by the side reaction between the epoxide compound and polyisocyanate. Therefore, the mechanical strength is rapidly developed but contribution to the fixation reaction of carbon dioxide becomes small. When the above ratio exceeds 2.0, the amount of the product of the side reaction between the epoxide compound and polyisocyanate increases too much and, therefore, the resin thermal conductivity of the foamed material is liable to increase. Even if the side reaction product can be sufficiently inhibited, the productivity is drastically lowered sometimes by delayed development of a mechanical strength of the polyurethane foamed material or an extension of time up to the time of mold releasing.

An excellent effect can also be obtained when epoxides contain an epoxide compound having a boiling point of more than 120° C. and an epoxide compound having low reactivity with polyisocyanate and a boiling point of 120° C. or less, and the epoxide compound having low reactivity with carbon dioxide is an epoxide compound having low reactivity with polyisocyanate. In this case, it is preferred that a ratio of the amount of the epoxy group of the epoxide compound having a boiling point of more than 120° C. to the amount of the epoxy group of the epoxide compound having a boiling point of 120° C. or less is from 0.2 to 2.0, because of the same reason as above.

As the outer shell and inner liner, which constitute the thermal insulating cabinet of the present invention, those which are normally used for a refrigerator, freezer and the like can be used. As the inner liner material, those capable of preventing air from invading and previously subjected to a treatment for imparting gas barrier properties are preferred.

The carbon dioxide fixation catalyst and epoxides used in the present invention will be explained in more detail hereinafter.

(1) Carbon dioxide fixation catalyst

The carbon dioxide fixation catalyst of the present invention is composed of a nucleophile and/or an electrophile. Specifically, as the nucleophile, halogen ion, alkoxy ion, phenoxy ion, perchlorate ion, cyanide ion, acetate ion, para-toluenesulfonic ion and the like may be used. Among them, halogen ion is effective. The effect is particularly remarkable when the halogen ion is an onium salt or a pair ion of an alkali halide.

As the onium salt having the halogen ion as the pair ion, ammonium salt, phosphonium salt, sulfonium salt and the like may be used. Particularly, halogenated tetraalkylammonium salt, halogenated tetraalkylphosphonium salt and the like are suitable. In the case of an onium salt having any alkyl chain, the same effect is obtained. As halogen which becomes the pair ion, chlorine, bromine and iodine are preferred. It is particularly effective when using bromine or iodine.

For example, tetramethylammonium halide, tetraethylammonium halide, tetrabutylammonium halide, trimethylbutylammonium halide, benzyltrimethylammonium halide, tetrabutylphosphonium halide, triphenylmethylphosphonium halide, tetraphenylphosphonium halide and the like can be used.

On the other hand, any alkyl halide can be used as the alkali halide.

As the electrophile, Lewis acid metal halide, organotin halide, organotin fatty acid ester, metal dialkyldithiocarbamate, acetylacetone metal salt, mercaptopyridine N-oxide metal salt and the like are effective. As the Lewis acid metal halide, zinc halide aluminum halide, titanium halide, chrome halide, molybdenum halide, tungsten halide, iron halide, cobalt halide, nickel halide and the like are used. Particularly, zinc halide is preferred. As the organotin halide, trimethyltin halide, tributyltin halide, triphenyltin halide and the like are used. As the organotin fatty acid ester, dibutyltin dilaurate, dibutyltin diacetate, tributyltin acetate and the like can be used. Examples of the metal dialkyldithiocarbamate include zinc dialkyldithiocarbamate, nickel dialkyldithiocarbamate, iron dialkyldithiocarbamate, copper dialkyldithiocarbamate and the like. Examples of the acetylacetone metal salt include acetylacetone cobalt salt, acetylacetone copper salt, acetylacetone zinc salt and the like. As the mercaptopyridine N-oxide metal salt, mercaptopyridine N-oxide zinc salt and the like can be used.

(2) Epoxides

Epoxides used in the present invention are composed of at least two members of epoxide compounds, and an excellent effect can be obtained when using any of the following three combinations.

(a) First, in the first combination, an epoxide complex wherein a carbon dioxide fixation catalyst coordinated to an oxirane ring is used as an epoxide compound having high reactivity with carbon dioxide.

Hereinafter, utilization of the epoxide complex will be explained.

This epoxide complex is an epoxide complex in which the epoxide compound is combined with the carbon dioxide fixation catalyst.

Carbon to which the nucleophile is coordinated is β-carbon causing a little steric hindrance to terminal-end epoxides. To inner epoxides, coordinated are the carbon which causes lesser steric hindrance and the carbon combined with a substituent having strong electrophlicity. On the other hand, the electrophile sometimes coordinates to one oxygen of the oxirane ring or coordinates to a plurality of oxygens. Regarding the epoxide complex, the rate of fixing carbon dioxide increases if any one of the nucleophile and electrophile is increased. When both nucleophile and electrophile are coordinated, the rate of fixing carbon dioxide increases furthermore.

The reactions wherein the nucleophile, electrophile and both of them react with epoxides and form a complex are shown in the following formulae (2), (3) and (4), respectively. The complex shown in the right side reacts with carbon dioxide and forms a cyclic carbonate.

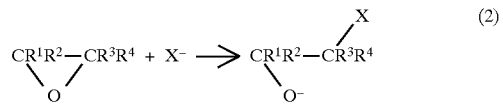 (2)

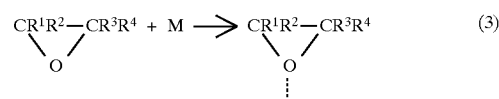 (3)

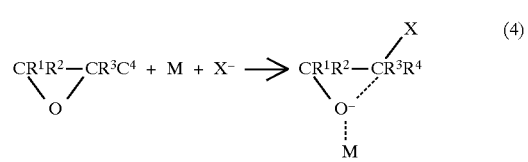 (4)

In the above formulae, $R^1$, $R^2$, $R^3$ and $R^4$ represent a hydrogen atom or a substituent; $X^-$ represents a nucleophile; and M represents an electrophile. Although epoxides are represented by a 3-membered ring in the above formulae, the same reaction occurs in the case of 4-membered or larger ring.

As the nucleophile, halogen ion is preferred. It is preferred to contain the halogen ion as an onium salt or an alkali metal halide. It is preferred that the electrophile is selected from the group consisting of a zinc compound and a tin compound.

The epoxide complex also includes those wherein the nucleophile is further coordinated to the electrophile part of the formula (4).

Figure 2:
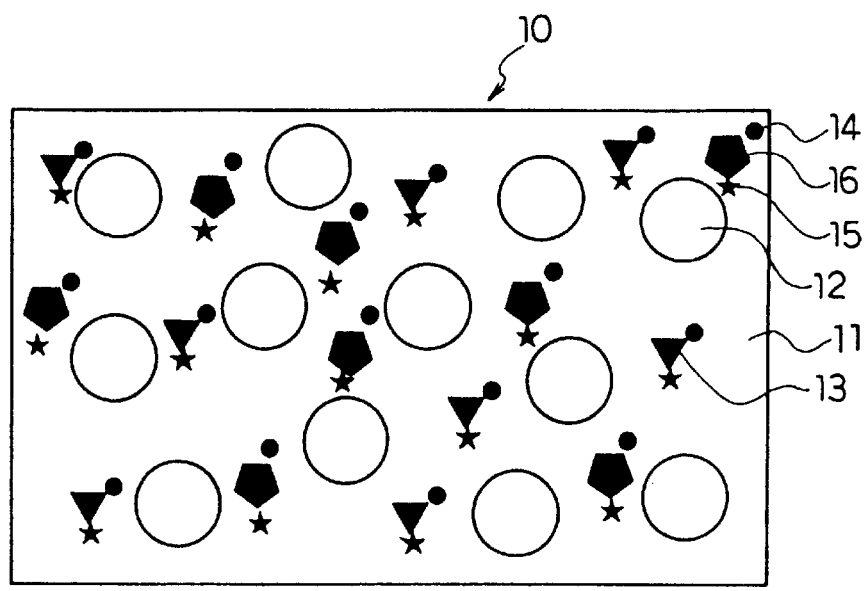
FIG. 2 is a schematic view showing a construction of the thermal insulating foamed material of the embodiment in accordance with the present invention.

FIG. 2 is a schematic view showing the construction of the thermal insulating foamed material made by using the epoxide complex of the present invention.

This thermal insulating foamed material 10 is composed of a urethane resin 11 having closed cells 12. In the urethane resin 11, an epoxide complex formed by reacting epoxides 13 with a nucleophile 14 and an electrophile 15 is dispersed and a carbonate 16 formed by reacting this epoxide complex with carbon dioxide is further dispersed. In FIG. 2, an example of using both nucleophile 14 and electrophile 15 is shown, but any one of them may be used as a matter of course.

Figure 3:
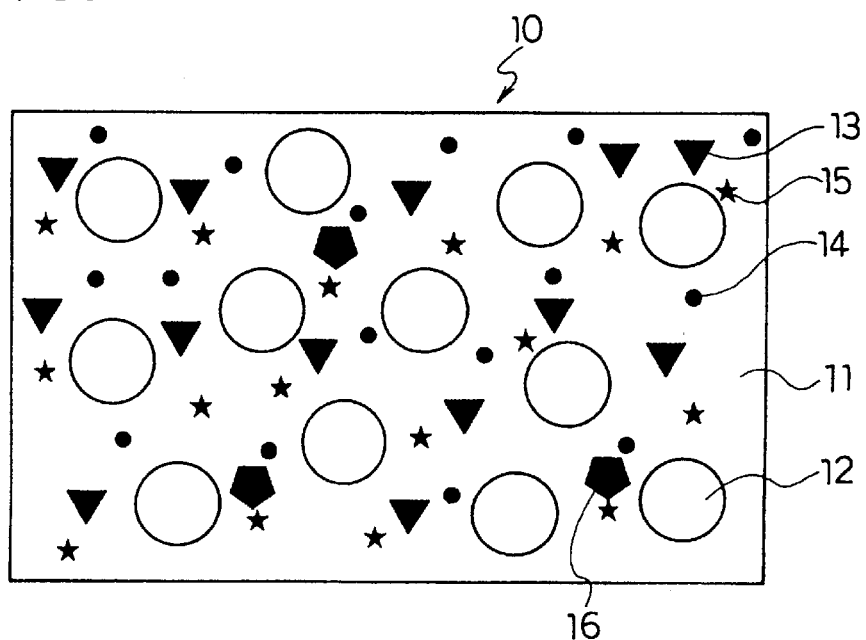
FIG. 3 is a schematic view showing a construction of a conventional thermal insulating foamed material.

On the other hand, FIG. 3 shows a construction example of the thermal insulating foamed material of a conventional technique. In comparison with FIG. 2, the nucleophile 14 or electrophile 15 dispersed in the urethane resin 11 does not exist in the vicinity of the epoxides 13. In FIG. 3, therefore, the nucleophile 14 or electrophile 15 must move in the urethane resin 11 so as to react with the epoxides 13 and the fixation rate of carbon dioxide becomes slow.

Advantages of the use of the epoxide complex wherein the carbon dioxide fixation catalyst is coordinated to an oxirane ring are as follows. Regarding the epoxide complex, the carbon dioxide catalyst is coordinated to the epoxide compound as a complex and, therefore, the above catalyst and epoxide are dispersed together in the foamed urethane resin composition in the state of being closed each other. Accordingly, the fixation rate of carbon dioxide becomes larger than that in the case wherein the above catalyst and epoxide complex are separately dispersed in the foamed urethane resin composition. When the polyurethane foamed material is formed, this epoxide complex rapidly fixes carbon dioxide in the closed cells, thereby to form a cyclic carbonate. Therefore, the partial pressure of carbon dioxide in the closed cells is lowered, thereby to improve the thermal insulating property.

Furthermore, the epoxide compound having low reactivity with carbon dioxide, added together with the epoxide complex, fixes gradually evolving carbon dioxide with a time lapse. In this case, since the cyclic carbonate compound produced from the epoxide complex contains the carbon dioxide fixation catalyst and has a high affinity for the epoxide compound, the fixation of carbon dioxide satisfactorily proceeds using the part of this cyclic carbonate compound as a nucleus.

The epoxide complex can be obtained by adding the epoxide compound and carbon dioxide fixation catalyst in a solvent thereby to react them with each other, and extracting or separating the resultant epoxide complex from the solvent. When the epoxide compound is liquid, the epoxide complex can also be obtained by adding the carbon dioxide fixation catalyst directly to epoxides without using the solvent.

In the present invention, a method of previously preparing the epoxide complex and dispersing it in a polyurethane raw material is preferred, but it is also possible to use a method of dispersing epoxides and the carbon dioxide fixation catalyst in the polyurethane raw material and forming the epoxide complex in the polyurethane raw material. In this case, when the epoxide compound and carbon dioxide fixation catalyst are merely dispersed in the polyurethane raw material, the concentration of the carbon dioxide fixation catalyst in the vicinity of epoxides is low and it becomes difficult to form the epoxide complex. Therefore, the fixation rate of carbon dioxide becomes low. Thus, it is necessary to increase the concentration of the carbon dioxide fixation catalyst in the vicinity of epoxides. Therefore, it is possible to use epoxides having an active moiety as the carbon dioxide fixation catalyst in the molecule and to use a polymer wherein the epoxy group and carbon dioxide fixation catalyst are introduced into the side chain.

In the method of the present invention, when the epoxide compound becomes a solid or high-viscosity oily substance after forming a complex, it is preferred to use a low-viscosity epoxide compound which has low reactivity for fixing carbon dioxide and forms no complex so as to improve handling properties.

Regarding the amount of epoxides for fixing carbon dioxide, the epoxide complex having an epoxy group whose molar amount corresponds to that of carbon dioxide which exists in the closed cells may be added to the polyurethane raw material. The epoxide complex may remain in the resultant thermal insulating foamed material by adding the epoxide complex whose molar amount is more than that of evolving carbon dioxide. In that case, since the concentration of the epoxide complex in the thermal insulating foamed material increases, a high carbon dioxide fixation rate can be obtained. Furthermore, since the epoxide complex and epoxide compound having low reactivity with carbon dioxide exist in the thermal insulating foamed material, carbon dioxide which may evolve with a time lapse can be fixed. Thereafter, a high thermal insulating property can be maintained for a long period of time.

When using the epoxide complex which is a reaction product between zinc halide and onium halide particularly, the urethane reaction rate by zinc halide as the electrophile can be drastically inhibited in the blowing step and there is an advantage of good handling. This reason is considered as follows. That is, in the above-mentioned epoxide complex, both of the zinc halide and onium halide are strongly coordinated to the epoxide to form an epoxide complex and besides, another onium halide is coordinated to the zinc moiety of the electrophile to form an epoxide complex. Therefore, this epoxide complex has lost an intrinsic urethane reaction activity of the zinc halide. It is considered that the side reaction between the epoxide complex and polyisocyanate is inhibited by this effect.

As the epoxide compound constituting the epoxide complex of the present invention, any compound having an epoxy group or a glycidyl group can be used. It is also possible to utilize a compound having a double-bonded unsaturated group in the molecule, an oligomer having an epoxy group at both terminal ends and oxetane (boiling point: 50° C.) or a derivative thereof. The epoxide compound may take any form such as vapor, liquid and solid. The epoxide compound of the present invention can combine the thermal insulating foamed material with the epoxy group when using epoxides having a plurality of epoxy groups or a plurality of functional groups such as hydroxyl group, carboxyl group, amino group and the like. Therefore, the effect of a curing agent on increasing the mechanical strength of the thermal insulating foamed material can be obtained. When a reactive-type flame retardant having an epoxy group (e.g., brominated phenylglycidyl ether, etc.) is used in combination with the epoxide compound, flame-retarding of the thermal insulating foamed material can be performed.

The following advantages can be obtained when using the epoxide compound having a boiling point of 120° C. or less as the epoxide complex. Although the epoxide compound having a boiling point of 120° C. or less is liable to be evaporated by heat evolving in the process of forming the foamed material, the epoxide complex is not easily vaporized. Therefore, the state where the carbon dioxide fixation catalyst is coordinated to the oxirane ring is held in the foamed material forming process and fixation of carbon dioxide by the epoxide compound efficiently proceeds.

Specific examples of the above-mentioned epoxide compound having a boiling point of 120° C. or less for constituting the epoxide complex include ethylene oxide (boiling point: 11° C.), propylene oxide (boiling point: 34° C.), 1,2-butylene oxide (boiling point: 63° C.), cis 2,3-butylene oxide (boiling point: 60° C.), trans 2,3-butylene oxide (boiling point: 54° C.), isobutylene oxide (boiling point: 52° C.), butadiene monoxide (boiling point: 65° C.), epichlorohydrin (boiling point: 110° C.), glycidyl methyl ether (110° C.), epoxyhexane (boiling point: 118° C.), epoxyhexene (boiling point: 119° C.) and the like.

Specific examples of other epoxide compound include normal epoxide compounds such as epoxyoctane, epoxydecane, epoxydodecane, epoxyhexadecane, epoxyoctadecane, epoxyoctene, glycidyl butyl ether, glycidyl isopropyl ether, glycidyl acrylate, glycidyl methacrylate, phenyl glycidyl ether, allyl glycidyl ether, epoxypropylbenzene, styrene oxide, N-(2,3-epoxypropyl) phthalimide and the like.

It is preferred that the epoxide compound having high reactivity with carbon dioxide is an epoxide complex wherein the carbon dioxide fixation catalyst is coordinated to an alkylene oxide, and the epoxide compound having low reactivity with carbon dioxide is an alkylene oxide. The construction wherein the epoxide compound having high reactivity with carbon dioxide is an epoxide complex in which the carbon dioxide fixation catalyst is coordinated to an alkylene oxide, and the epoxide compound having low reactivity with carbon dioxide comprises an alkylene oxide and a glycidyl ether is preferred.

The epoxide complex wherein the carbon dioxide fixation catalyst is coordinated to an alkylene oxide is in the solid or oil state and has a low compatibility with the alkylene oxide and, therefore, a dispersed state is obtained even if they are mixed. Since this epoxide complex has a low affinity for polyol, the foamed material is formed from the dispersion while this epoxide complex gradually becomes affinitive at the time of forming the polyurethane foamed material. Therefore, this epoxide complex becomes the state where the concentration is high at the dispersed part, thereby to fix carbon dioxide more efficiently in comparison with the epoxide complex which becomes the compatibilized state. The alkylene oxide has a low compatibility with this epoxide complex, but has a good compatibility with a carbonate compound produced by fixing carbon dioxide. Therefore, fixation of carbon dioxide satisfactorily proceeds using the position where fixation has sufficiently proceeded as a nucleus. Furthermore, glycidyl ethers are suitable for adjusting the compatibility between the epoxide complex wherein the carbon dioxide fixation catalyst is coordinated to an alkylene oxide and the alkylene oxide, and adjusting the fixation rate of carbon dioxide. Examples of the other epoxide compound having this function include glycidyl esters, glycidylamines and the like.

Specific examples of the above-mentioned alkylene oxide include 1,2-butylene oxide, cis 2,3-butylene oxide, trans 2,3-butylene oxide, isobutylene oxide, ethylene oxide, propylene oxide, epoxyhexane, epoxyoctane, epoxydecane, epoxydodecane, epoxyhexadecane, epoxyoctadecane and the like. The same effect can be obtained by a compound having an epoxy group and a double-bonded unsaturated group, such as epoxyhexene, epoxyoctene, butadiene monoxide and the like.

The rate of forming a complex by reacting the epoxide compound with the carbon dioxide fixation catalyst varies depending on the epoxide compound or carbon dioxide fixation catalyst to be used. Therefore, it is sometimes insufficient to merely mix the epoxide compound with the carbon dioxide fixation catalyst for a short time in order to form a complex. When the solubility of the carbon dioxide fixation catalyst in the epoxide compound is particularly low, the complex formation rate is low and, therefore, it is necessary to sufficiently mix epoxide with the carbon dioxide fixation catalyst with stirring. For example, when zinc chloride is mixed with brominated tetrabutylammonium with stirring to form a complex, the respective carbon dioxide fixation catalysts and the resultant epoxide complex do not easily dissolve in 1,2-butylene oxide and, therefore, a comparatively long stirring is required to form a complex. This complex is formed in the dispersed state of a white powdered solid.

On the other hand, when a complex is formed by mixing phenyl glycidyl ether, zinc chloride and brominated tetrabutylammonium with stirring, the respective carbon dioxide fixation catalysts easily dissolve in epoxides and, therefore, a complex is formed in a comparatively short time. When the nucleophile and electrophile are used as the carbon dioxide fixation catalyst, an epoxide complex can be efficiently formed by previously forming a complex salt from the nucleophile and electrophile and adding the resultant complex salt to epoxides. In the case of the combination of the above-mentioned 1,2-butylene oxide, zinc chloride and brominated tetrabutylammonium, for example, a complex salt is previously made from zinc chloride and brominated tetrabutylammonium, and then the resultant complex salt is added to 1,2-butylene oxide.

(b) Next, the second combination of epoxides is exemplified that epoxides contain an epoxide compound having high reactivity with polyisocyanate and an epoxide compound having low reactivity with polyisocyanate, and the epoxide compound having low reactivity with carbon dioxide is an epoxide compound having high reactivity with polyisocyanate.

When using such epoxides, the epoxide compound having high reactivity with polyisocyanate reacts with polysiocyanate, preferentially and rapidly, in comparison with the epoxide compound having low reactivity with polyisocyanate, thereby to constitute the resin component. Accordingly, development of the mechanical strength of the foamed material rapidly proceeds and, at the same time, an excellent foamed material having low resin thermal conductivity can be formed without increasing the thermal conductivity of the resin of the polyurethane foamed material.

On the other hand, the epoxide compound having low reactivity with polyisocyanate has an activity to fixation of carbon dioxide and fixes carbon dioxide, rapidly and sufficiently, at the time of forming the foamed material, thereby to reduce a partial pressure of carbon dioxide inside the closed cells. When a volatile blowing agent is contained in the closed cells, a ratio of vapor of the volatile blowing agent increases. Therefore, an increase in vapor thermal conductivity caused by carbon dioxide of the thermal insulating foamed material can be improved. In addition, the epoxy group remaining in the resin component, formed by the reaction of the epoxide compound having high reactivity with polyisocyanate, has low reactivity with carbon dioxide, but plays a role of slowly fixing carbon dioxide which evolves gradually with a time lapse and prevents the vapor thermal conductivity from increasing. Accordingly, a thermal insulating foamed material having high reliability can be provided.

Explaining a specific construction, the first construction is exemplified that the epoxide compound having high reactivity with polyisocyanate is a polyglycidyl ether having two or more epoxy groups, and the epoxide compound having low reactivity with polyisocyanate is a monoglycidyl ether having one epoxy group. It is preferred because polyglycidyl ethers having two or more epoxy groups is polyfunctional and a component having a sufficient strength is constituted as the urethane resin component. The epoxy groups remaining without being converted into a resin can fix carbon dioxide which evolves with a time lapse.

As the specific epoxide compound, monoglycidyl ethers having one epoxy group, such as allyl glycidyl ether, butyl glycidyl ether, phenyl glycidyl ether or a derivative thereof, are preferred. As polyglycidyl ethers having two or more epoxy groups, various epoxy resins represented by ethylene glycol diglycidyl ether, neopentyl glycol diglycidyl ether, pentaerythritol polyglycidyl ether or condensates of bisphenol A with epichlorohydrin are preferred. A brominated bisphenol A epoxy resin can also be applied.

The second construction is exemplified that the epoxide compound having high reactivity with polyisocyanate is a polyglycidyl ether having at least one hydroxyl group, and the epoxide compound having low reactivity with polyisocyanate is a glycidyl ether having no hydroxyl group. Regarding glycidyl ethers having a hydroxyl group, the hydroxyl group has the same reaction activity as that of polyol and selectively reacts with polyisocyanate. The epoxy group also reacts with polyisocyanate, thereby to constitute the resin component. Regarding those wherein only a hydroxyl group has reacted, an epoxy group remains and the epoxy group can fix carbon dioxide evolving with a time lapse.

Specific examples of the epoxide compound include glycidyl ether having at least one hydroxyl group, such as glycidol, glycerol polyglycidyl ether and the like. Examples of the glycidyl ether having no hydroxyl group include monoglycidyl ethers such as phenyl glycidyl ether and the like; and polyglycidyl ethers such as ethylene glycol diglycidyl ether and the like. A polyfunctional polymer epoxy compound is preferred.

Third, the construction wherein the epoxide compound having high reactivity with polyisocyanate is a polyglycidylamine, and the epoxide compound having low reactivity with polyisocyanate is a glycidyl ether is preferred. Since polyglycidyl ethers per se have a catalytic activity for urethane reaction, the reaction activity with polyisocyanate is the same as or more than that of polyol. Therefore, they selectively react with polyisocyanate, thereby to constitute the resin component having a sufficient strength.

Specific examples of the epoxide compound include glycidyl amines represented by polyglycidylamine type epoxy resin such as grade 604 (manufactured by YUKA SHELL EPOXY Co., Ltd.), grade ELM-120 (manufactured by SUMITOMO Chemical Industries Co., Ltd.) and the like. Examples of glycidyl ethers include monoglycidyl ethers such as phenyl glycidyl ether and the like; and polyglycidyl ethers such as ethylene glycol diglycidyl ether and the like. A polyfunctional polymer epoxy compound is preferred.

The above-mentioned specific epoxide compounds are typical examples, and are not limited to these combinations.

(c) The third combination of epoxides is exemplified that epoxides contain an epoxide compound having a boiling point of more than 120° C. and an epoxide compound having low reactivity with polyisocyanate and a boiling point of 120° C. or less, and the epoxide compound having low reactivity with carbon dioxide is an epoxide compound having low reactivity with polyisocyanate.

When using the epoxides, the epoxide compound having a boiling point of 120° C. or less is vaporized by reaction heat generated in the foamed resin composition at the time of blowing and, therefore, the reaction between epoxide and polyisocyanate scarcely proceeds. After forming the polyurethane foamed material having a sufficient mechanical strength, the epoxide fixes carbon dioxide inside the closed cells, thereby to improve the thermal conductivity. Furthermore, this epoxide compound also plays a role of fixing carbon dioxide that evolves with a time lapse, and a thermal insulating foamed material having high reliability can be obtained.

On the other hand, the epoxide compound having a boiling point of more than 120° C. contributes to rapid fixation of carbon dioxide in the closed cells at the time of blowing. Since this epoxide compound simultaneously performs fixation of carbon dioxide and side reaction with the polyisocyanate, those which cause little deterioration of the thermal conductivity of the resin are selected.

It is preferred that the above-mentioned epoxide compound having a boiling point of more than 120° C. is a glycidyl ether, a glycidyl ester or a glycidylamine, and the epoxide compound having a boiling point of 120° C. or less is an alkylene oxide. The above-mentioned general epoxide compounds are used as glycidyl ethers and glycidylamines. The general epoxide compound can also be applied to glycidyl esters. Examples thereof include glycidyl methacrylate, glycidyl benzoate, diglycidyl phthalate and a derivative thereof.

Specific examples of the present invention will be explained in detail hereinafter.

EXAMPLE 1

A white solid epoxide complex (average epoxy equivalent: 630) was prepared from 1,2-butylene oxide, zinc chloride and tetraethylammonium bromide. 32.3 parts by weight (hereinafter "parts by weight" are abbreviated to "parts") of this epoxide complex was dispersed in 7.1 parts of 1,2-epoxyoctane (epoxy equivalent: 128), thereby to prepare a mixed solution of the epoxide complex and epoxide compound. A ratio (hereinafter abbreviated to an "epoxide complex mixing ratio") of the molar amount of the epoxy group of the epoxide complex to that of the epoxy group of the epoxide compound in this mixed solution is about 0.93.

A polyol composition was prepared by mixing 35.9 parts of an epoxide comprising this mixed solution for fixing carbon dioxide, 100 parts of an aromatic amine polyether polyol (hydroxyl group value: 500 mg KOH/g), 15 parts of cyclopentane, 1 part of water, 3 parts of a foam stabilizer and 3 parts of a urethane reaction catalyst.

A mixing/blowing step was performed using this polyol composition and 133 parts of polyisocyanate, thereby to obtain a polyurethane foamed material.

When the urethane reaction catalyst was not added, the resultant polyol composition hardly accelerated a urethane reaction rate. That is, a carbon dioxide fixation catalyst did not accelerate the urethane reaction by forming an epoxide complex.

EXAMPLE 2

8.0 parts of 1,2-butylene oxide (epoxy equivalent: 72), 1.2 parts of zinc chloride and 5.7 parts of tetrabutylammonium bromide were mixed, followed by stirring for 3 days. In such way, epoxides (epoxide complex mixing ratio: about 0.09) wherein the epoxide complex and epoxide compound are mixed were prepared. This epoxide complex was formed as a separated white solid substance in an epoxide solution.

On the other hand, a mixed solution wherein 100 parts of an aromatic amine polyether polyol (hydroxyl group value: 500 mg KOH/g), 15 parts of cyclopentane, 1 part of water, 3 parts of a foam stabilizer and 3 parts of a urethane reaction catalyst are mixed was prepared. A polyol composition was prepared by adding 15 parts of epoxides prepared above to this solution.

A mixing/blowing step was performed using this polyol composition and 133 parts of polyisocyanate, thereby to obtain a polyurethane foamed material.

EXAMPLE 3

16.7 parts of 1,2-epoxyhexane (epoxy equivalent: 100), 0.6 parts of zinc chloride and 5.7 parts of tetrabutylammonium bromide were mixed, followed by stirring for 3 days, thereby to prepare an epoxide mixed solution (epoxide complex mixing ratio: about 0.03) wherein the epoxide complex and epoxide compound are mixed. This epoxide complex was formed as a separated yellow oily substance in an epoxide solution.

On the other hand, a mixed solution wherein 100 parts of an aromatic amine polyether polyol (hydroxyl group value: 500 mg KOH/g), 15 parts of cyclopentane, 1 part of water, 3 parts of a foam stabilizer and 3 parts of a urethane reaction catalyst are mixed was prepared. A polyol composition was prepared by adding 30.6 parts of epoxides solution prepared above to this solution.

A mixing/blowing step was performed using this polyol composition and 133 parts of polyisocyanate, thereby to obtain a polyurethane foamed material.

EXAMPLE 4

8.0 parts of 1,2-butylene oxide, 1.2 parts of zinc chloride and 5.7 parts of tetrabutylammonium bromide were mixed, followed by stirring for 3 days, thereby to prepare a mixture of the epoxide complex and epoxide compound. This epoxide complex was formed as a separated white solid substance in an epoxide solution. 5 parts of neopentyl glycol diglycidyl ether (average epoxide equivalent: 108) was further mixed with this mixed solution with stirring, thereby to obtain epoxides (epoxide complex mixing ratio: about 0.06). Almost all the epoxide complex was separated as a white solid, while the remainder dissolved in the epoxide compound solution, thereby to form a pale yellow mixed solution. At this time, the compatibility of the solid content with the mixed solution of the epoxide compound increased and, therefore, the dispersed state was improved.

On the other hand, a mixed solution wherein 100 parts of an aromatic amine polyether polyol (hydroxyl group value: 500 mg KOH/g), 15 parts of cyclopentane, 1 part of water, 3 parts of a foam stabilizer and 3 parts of a urethane reaction catalyst are mixed was prepared.

A mixing/blowing step was performed using this polyol composition, 133 parts of polyisocyanate and 19.9 parts of epoxides for fixing carbon dioxide prepared above, thereby to obtain a polyurethane foamed material.

Comparative Example 1

In the same manner as in Example 2 except for reducing the stirring time in the case of mixing 1,2-butylene oxide, zinc chloride and tertabutylammonium bromide to 5 minutes in Example 2, a polyol composition was prepared. A mixing/blowing step was performed using this polyol composition and 133 parts of polyisocyanate. As a result, the urethane reaction rate was considerably high and a good polyurethane foamed material could not be obtained.

Therefore, a blowing was performed without adding the urethane reaction catalyst, thereby to obtain a polyurethane foamed material.

Comparative Example 2

In the same manner as in Example 3 except for reducing the stirring time in the case of mixing 1,2-epoxyhexane, zinc chloride and tertabutylammonium bromide to 5 minutes in Example 3, a polyurethane foamed material was obtained. In the same manner as in Comparative Example 1, the urethane reaction rate was considerably high and a good polyurethane foamed material could not be obtained. Therefore, a polyurethane foamed material was made by adding no urethane reaction catalyst.

With respect to the polyurethane foamed materials obtained in Examples 1 to 4 and those obtained in Comparative Examples 1 and 2, the amount of carbon dioxide in the closed cells per 1000 cc of the foamed material one day after blowing was determined by gas chromatography. Furthermore, the thermal conductivity of the foamed material one day after blowing was measured. The respective results of measurement are shown in Table 1. In the examples of the present invention, the amount of carbon dioxide in the closed cells was smaller than that of the comparative examples and good results of the thermal insulating property were obtained. In the examples, the fixation of carbon dioxide proceeds with a time lapse and a thermal insulating foamed material with an improved thermal insulating property could be obtained. In the comparative examples, the epoxide complex was hardly formed and the urethane reaction catalyst could not be added and, therefore, a sufficient mechanical strength of the foamed material was not obtained and shrinkage occurred with a time lapse.

TABLE 1

|  | Amount of carbon dioxide per 1000 cc of foamed material (cc) | Thermal conductivity (W/mK) |
| --- | --- | --- |
| Example 1 | 78 | 0.0206 |
| Example 2 | 110 | 0.0209 |
| Example 3 | 121 | 0.0211 |
| Example 4 | 60 | 0.0204 |
| Comparative Example 1 | 153 | 0.0216 |
| Comparative Example 2 | 190 | 0.0221 |

EXAMPLE 5

A polyol composition as a solution A was prepared from 100 parts by weight of an aromatic amine polyether polyol having a hydroxyl group value of 460 (mg KOH/g), 2.0 parts of KAOLIZER No.1 manufactured by Kao Corporation as the urethane reaction catalyst, 1.5 parts of a silicone surfactant F-335 manufactured by Shin-Etsu Chemical Co., Ltd. as the foam stabilizer, 1.0 part of water as the reactive blowing agent and cyclopentane as the volatile blowing agent. The formulation ratio of cyclopentane was adjusted so that the free blow density of the resultant thermal insulating foamed material becomes 25–27 kg/m$^3$. As epoxides for fixing carbon dioxide, phenylglycidyl ether (epoxy equivalent: 150) as monoglycidyl ethers was mixed with a bisphenol A type epoxy resin grade 828 (average epoxy equivalent: 190) manufactured by YUKA SHELL EPOXY Co., Ltd. as polyglycidyl ethers, followed by mixing with tetrabutylammonium bromide as the carbon dioxide fixation catalyst. The resultant is referred to as a "solution B". The mixing ratio of the respective components in the solution B is shown in Table 2 (it is based on 100 parts by weight of the above-mentioned polyether polyol. It is the same in the following examples). A polyol composition was prepared by mixing this solution B with the above-mentioned solution A. On the other hand, CLUDE MDI having an amine equivalent of 135 was used as polyisocyanate.

The total amount of epoxides corresponds to the amount containing the epoxy group of about 4 mol per mol (stoichiometric amount) of carbon dioxide generated by the reaction between 1.0 part of water as the reactive blowing agent and polyisocyanate.

The ratio (Ep/Em, hereinafter referred to as an "epoxy ratio") of the molar amount (Ep) of the epoxy group of polyglycidyl ethers to the molar amount (Em) of the epoxy group of monoglycidyl ethers is also shown in Table 2.

The polyol composition thus prepared was mixed with polyisocyanate in a ratio that an NCO group is formulated in an amount of 1.05 equivalents per hydroxyl group of the polyol composition, and then the resultant raw material mixture was injected into the space part formed by an inner liner and an outer shell and blown. In such way, a thermal insulating cabinet whose space part is filled with the polyurethane foamed material was obtained. The formulation ratio of polyisocyanate corresponds to the amount wherein the excess NCO groups corresponding to about 25% of the epoxy groups of epoxides are added to the NCO groups of the same equivalent as that of the hydroxyl groups in the raw material.

cidyl ethers are removed from the raw material mixture of Example 5 (Comparative Example 3-2), a thermal insulating foamed material was obtained in the same manner as stated above. With respect to the case where the formulation ratio of polyisocyanate was adjusted so that the amount of the NCO group becomes 0.95 equivalents per hydroxyl group of the polyol composition (Comparative Example 3-3) and the case where the amount of the NCO group becomes 1.15 equivalents per hydroxyl group of the polyol composition (Comparative Example 3-4) in Example 5-2, a thermal insulating foamed material was obtained in the same manner as stated above. In Comparative Example 3-4, the excess NCO groups which are enough to be able to react with 50% or more of the epoxy groups in epoxides are formulated. The results of these comparative examples are also shown in Table 2.

TABLE 2

|   |   |   | Example | | | Comparative Example | | | |
|---|---|---|---|---|---|---|---|---|---|
|   |   |   | 5-1 | 5-2 | 5-3 | 3-1 | 3-2 | 3-3 | 3-4 |
| Mixing ratio of solution B | Monoglycidyl ethers | | 21.7 | 17.4 | 13.0 | 34.8 |  | 17.4 | 17.4 |
|   | Polyglycidal ethers | | 13.8 | 18.3 | 22.9 |  | 36.7 | 18.3 | 18.3 |
|   | Carbon dioxide fixation catalyst | | 2.0 | 2.0 | 2.0 | 2.0 | 2.0 | 2.0 | 2.0 |
| Epoxy ratio (Ep/Em) | | | 0.50 | 0.83 | 1.39 | 0 | — | 0.83 | 0.83 |
| Equivalent of NCO per hydroxyl group | | | 1.05 | 1.05 | 1.05 | 1.05 | 1.05 | 0.95 | 1.15 |
| Evaluation results | one day after aging | Thermal conductivity (W/mK) | 0.0172 | 0.0170 | 0.0170 | 0.0175 | 0.0180 | 0.0170 | 0.0180 |
|   |   | Gas composition (%) CO$_2$ | 5 | 5 | 5 | 5 | 25 | 5 | 25 |
|   |   | CP | 95 | 95 | 95 | 95 | 75 | 95 | 75 |
|   | one week after aging | Thermal conductivity (W/mK) | 0.0171 | 0.0170 | 0.0169 | 0.0175 | 0.0170 | 0.0170 | 0.0170 |
|   |   | Gas composition (%) CO$_2$ | 5 | 5 | 5 | 5 | 5 | 5 | 5 |
|   |   | CP | 95 | 95 | 95 | 95 | 95 | 95 | 95 |
|   | Expansion amount of thermal insulating cabinet | | <3 mm | <3 mm | <3 mm | 6–8 mm | <3 mm | 5–7 mm | <3 mm |

With respect to the thermal insulating cabinet thus obtained, the thermal insulating foamed material was collected after a predetermined aging time has passed. Then, the thermal conductivity of the thermal insulating foamed material and gas composition in the same foamed material were determined. In order to examine the development state of the mechanical strength of the thermal insulating foamed material, the thermal insulating cabinet was removed from the mold after 8 minutes have passed after blowing. Then, the amount of expansion of the side part of the thermal insulating cabinet formed after removal from the mold was measured. These results are shown in Table 2. In Table 2, "CP" in the column of the gas composition indicates cyclopentane (it is also the same in the following Tables).

Comparative Example 3

With respect to the case where polyglycidyl ethers are removed from the raw material mixture of Example 5 (Comparative Example 3-1) and the case where monogly- In Example 5, monoglycidyl ethers and polyglycidyl ethers are used as epoxides. The resultant thermal insulating foamed material includes products of side reactions such as polymerization of epoxides and polyisocyanate, polymerization of epoxides and polyol and polymerization of epoxides. However, as is apparent from a comparison between characteristics of foamed materials shown in Table 2, the thermal conductivity of the resin of the polyurethane foamed material is not increased. Carbon dioxide which is generated by the reaction between water and polyisocyanate and remains inside the closed cells is rapidly fixed, and the ratio of cyclopentane as the volatile blowing agent is increased. In such way, a thermal insulating foamed material having an excellent thermal insulating property is obtained by using monoglycidyl ethers and polyglycidyl ethers as epoxides.

Comparative Example 3-1 is an example using only monoglycidyl ethers as the epoxide compound for fixing carbon dioxide. According to this example, a capability of sufficiently fixing carbon dioxide which evolves in the blowing step is obtained but the thermal conductivity of the thermal insulating foamed material is larger than that of the examples. This reason is considered as follows. That is, monoglycidyl ethers reacted with polyisocyanate in not a little degree in the forming process of the thermal insulating foamed material and the thermal conductivity of the resin of the resultant thermal insulating foamed material was decreased due to the reaction product and, therefore, the thermal conductivity of the thermal insulating foamed material could not be sufficiently improved after fixing carbon dioxide. The thermal insulating foamed material takes a lot of time to develop the mechanical strength and the expansion amount of the thermal insulating cabinet after removal from the mold is large, which results in remarkable deteriorations of appearance and quality of the thermal insulating cabinet.

Comparative Example 3-2 is an example using only polyglycidyl ethers as the epoxide compound for fixing carbon dioxide. The thermal conductivity of the resultant thermal insulating foamed material was finally improved to the same property as that of Example 5. However, an aging time of about one week is required and the productivity is drastically poor. This reason is considered as follows. That is, the fixation rate of carbon dioxide is low and the decrease amount of carbon dioxide is little at the stage of an aging time of about one day.

Comparative Example 3-3 is an example wherein the formulation ratio of polyisocyanate was adjusted so that the amount of the NCO group becomes 0.95 equivalents per hydroxyl group of the polyol composition. According to this example, the thermal insulating foamed material takes a lot of time to develop the mechanical strength and the expansion amount of the thermal insulating cabinet after removal from the mold is large, which results in remarkable deteriorations of appearance and quality of the thermal insulating cabinet.

Comparative Example 3-4 is an example wherein the excess NCO groups which are enough to be able to react with 50% or more of the epoxy groups in epoxides are formulated. In this case, the unreacted epoxy group can not remain sufficiently and an aging time of about one week is required to finally improve the thermal conductivity to the same property as that of Example 5, and the productivity is drastically poor.

EXAMPLE 6

A mixed solution prepared in the same manner as in Example 5 was used as the solution A of the polyol composition.

As epoxides, glycidol of glycidyl ethers having a hydroxyl group (epoxy equivalent: 74) was mixed with a bisphenol A type epoxy resin grade 828 (average epoxy equivalent: 190) manufactured by YUKA SHELL EPOXY Co., Ltd as glycidyl ethers having no hydroxyl group. To this mixture was added tetrabutylammonium bromide as the carbon dioxide fixation catalyst, thereby to obtain a solution C. The mixing ratio of the respective components of the solution C is shown in Table 3.

The total amount of epoxides corresponds to the amount containing the epoxy group of about 4 mol per mol (stoichiometric amount) of carbon dioxide generated by the reaction between 1.0 part of water of the reactive blowing agent and polyisocyanate.

The ratio (Eh/El) of the molar amount (Eh) of the epoxy group of polyglycidyl ethers having a hydroxyl group to the molar amount (El) of the epoxy group of monoglycidyl ethers having no hydroxyl group, that is, the ratio of the molar amount of the epoxy group of glycidyl ethers having high reactivity with isocyanate to the molar amount of the epoxy group of glycidyl ethers having low reactivity with isocyanate is also shown in Table 3.

The mixed solution A of the polyol composition, mixed solution C and the same polyisocyanate as that of Example 5 were injected into the space part formed between the inner liner and the outer shell and blown, using a high-pressure blowing machine. The formulation ratio of polyisocyanate was adjusted so that the amount of the NCO group becomes 1.05 equivalents per hydroxyl group in the mixed solution A and mixed solution C. This amount corresponds to the amount wherein the NCO groups of the same equivalent as that of the hydroxyl group in the raw material and excess NCO groups corresponding to about 25% of epoxy groups of the epoxide compound are added.

With respect to the thermal insulating cabinet thus obtained, the thermal insulating foamed material was collected after a predetermined aging time has passed in the same manner as in Example 5. Then, the thermal conductivity of the thermal insulating foamed material and gas composition in the same foamed material were determined. In the same manner as in Example 5, the amount of expansion of the side part of the thermal insulating cabinet formed after removal from the mold was measured. These results are shown in Table 3.

Comparative Example 4

With respect to the case where glycidyl ethers having a hydroxyl group are removed from the raw material mixture of Example 6 (Comparative Example 4-1) and the case where glycidyl ethers having no hydroxyl group are removed from the raw material mixture of Example 6 (Comparative Example 4-2), a thermal insulating foamed material was obtained in the same manner as stated above. With respect to the case where the formulation ratio of polyisocyanate was adjusted so that the amount of the NCO group becomes 0.95 equivalents per hydroxyl group in the polyol composition and epoxides (Comparative Example 4-3) and the case where the amount of the NCO group becomes 1.15 equivalents per hydroxyl group of the polyol composition and epoxides (Comparative Example 4-4) in Example 6-2, a thermal insulating foamed material was obtained in the same manner as stated above. In Comparative Example 4-4, the excess NCO groups which are enough to be able to react with 50% or more of the epoxy groups in epoxides are formulated. The results of these comparative examples are also shown in Table 3.

As is apparent from a comparison shown in Table 3, it becomes possible to rapidly fix carbon dioxide remaining inside the closed cells and to increase the ratio of cyclopentane as the volatile blowing agent without increasing the resin thermal conductivity of the polyurethane foamed material by using a mixture of glycidyl ethers having a hydroxyl group and glycidyl ethers having no hydroxyl group as epoxides, thereby to obtain a thermal insulating foamed material having an excellent thermal insulating property. It is also possible to rapidly develop the mechanical strength of the thermal insulating foamed material, thereby to improve the productivity.

In Comparative Example 4-1, it was possible to finally improve to the same property as that of Example 6 in the same manner as in Comparative Example 3-1, but the productivity was drastically deteriorated.

In Comparative Example 4-2, the productivity was drastically deteriorated in the same manner as in Comparative Example 3-2.

In Comparative Example 4-3, the appearance and quality of the thermal insulating cabinet were drastically deteriorated in the same manner as in Comparative Example 3-3.

In Comparative Example 4-4, the productivity was drastically deteriorated in the same manner as in Comparative Example 3-4.

TABLE 3

|  |  | Example | | | Comparative Example | | | |
|---|---|---|---|---|---|---|---|---|
|  |  | 6-1 | 6-2 | 6-3 | 4-1 | 4-2 | 4-3 | 4-4 |
| Mixing ratio of solution C | Glycidyl ethers having no hydroxyl group | 22.9 | 18.3 | 13.8 | 36.7 |  | 18.3 | 18.3 |
|  | Glycidyl ethers having hydroxyl group | 6.2 | 8.2 | 10.3 |  | 16.4 | 8.2 | 8.2 |
|  | Carbon dioxide fixation catalyst | 2.0 | 2.0 | 2.0 | 2.0 | 2.0 | 2.0 | 2.0 |
| Epoxy ratio (Eh/El) |  | 0.69 | 1.16 | 1.90 | 0 | — | 1.16 | 1.16 |
| Equivalent of NCO per hydroxyl group |  | 1.05 | 1.05 | 1.05 | 1.05 | 1.05 | 0.95 | 1.15 |
| Evaluation results | one day after aging | Thermal conductivity (W/mK) | 0.0171 | 0.0169 | 0.0169 | 0.0180 | 0.0190 | 0.0170 | 0.0180 |
|  |  | Gas composition (%) $CO_2$ | 5 | 5 | 5 | 25 | 50 | 5 | 25 |
|  |  | CP | 95 | 95 | 95 | 75 | 50 | 95 | 75 |
|  | one week after aging | Thermal conductivity (W/mK) | 0.0171 | 0.0169 | 0.0169 | 0.0170 | 0.0180 | 0.0170 | 0.0170 |
|  |  | Gas composition (%) $CO_2$ | 5 | 5 | 5 | 5 | 25 | 5 | 5 |
|  |  | CP | 95 | 95 | 95 | 95 | 75 | 95 | 95 |
|  | Expansion amount of thermal insulating cabinet |  | <3 mm | <3 mm | <3 mm | <3 mm | <3 mm | 5–7 mm | <3 mm |

EXAMPLE 7

A mixed solution prepared in the same manner as in Example 5 was used as the solution A of the polyol composition.

As epoxides, a bisphenol A type epoxy resin grade 828 (average epoxy equivalent: 190) manufactured by YUKA SHELL EPOXY Co., Ltd as glycidyl ethers was mixed with a polyglycidyl amine type epoxy resin grade 604 (average epoxy equivalent: 120) manufactured by YUKA SHELL EPOXY Co., Ltd. as glycidylamines. To this mixture added was tetrabutylammonium bromide as the carbon dioxide fixation catalyst. This mixed solution is referred to as a "solution D". The mixing ratio of the respective components of the solution D is shown in Table 4. A polyol composition was prepared by mixing the solution D with the above-mentioned solution A. CLUDE MDI having an amine equivalent was used as polyisocyanate.

The total amount of the epoxide compounds corresponds to the amount containing the epoxy group of about 4 mol per mol (stoichiometric amount) of carbon dioxide generated by the reaction between 1.0 part of water of the reactive blowing agent and polyisocyanate.

The ratio (Ea/Ee) of the molar amount (Ea) of the epoxy group of glycidylamines to the molar amount (Ee) of the epoxy group of glycidyl ethers is shown as the epoxy ratio in Table 4.

The above-mentioned polyol composition was mixed with polyisocyanate in a ratio that the NCO groups are formulated in an amount of 1.05 equivalents per hydroxyl group of the polyol composition, and then this raw material mixture was injected into the space part formed between the inner liner and the outer shell and blown, using a high-pressure blowing machine. The formulation ratio corresponds to the amount wherein the NCO groups of the same equivalent as that of the hydroxyl groups in the raw material and excess NCO groups corresponding to about 25% of epoxide groups of the epoxide compounds are added.

With respect to the thermal insulating cabinet thus obtained, the thermal insulating foamed material was collected after a predetermined aging time has passed according to the same manner as in Example 5. Then, the thermal conductivity of the thermal insulating foamed material and gas composition in the same foamed material were determined. The amount of expansion of the side part of the thermal insulating cabinet formed after removal from the mold was measured. These results are shown in Table 4.

Comparative Example 5

With respect to the case where glycidylamines are removed from the raw material mixture of Example 7 (Comparative Example 5-1) and the case where glycidyl ethers are removed from the raw material mixture of Example 7 (Comparative Example 5-2), a thermal insulating foamed material was obtained in the same manner as stated above. With respect to the case where the formulation ratio of polyisocyanate was adjusted so that the amount of the NCO group becomes 0.95 equivalents per hydroxyl group in the polyol composition (Comparative Example 5-3) and the case where the amount of the NCO group becomes 1.15 equivalents per hydroxyl group of the polyol composition (Comparative Example 5-4) in Example 7-2, a thermal insulating foamed material was obtained in the same manner as stated above. In Comparative Example 5-4, the excess NCO groups which are enough to be able to react with 50% or more of the epoxy groups in epoxides are formulated. The results of these comparative examples are also shown in Table 4.

TABLE 4

|  |  | Example | | | Comparative Example | | | |
| --- | --- | --- | --- | --- | --- | --- | --- | --- |
|  |  | 7-1 | 7-2 | 7-3 | 5-1 | 5-2 | 5-3 | 5-4 |
| Mixing ratio of solution D | Glycidyl ethers | 22.9 | 18.3 | 13.8 | 36.7 |  | 18.3 | 18.3 |
|  | Glycidylamines | 10.0 | 13.4 | 16.8 |  | 26.9 | 13.4 | 13.4 |
|  | Carbon dioxide fixation catalyst | 2.0 | 2.0 | 2.0 | 2.0 | 2.0 | 2.0 | 2.0 |
| Epoxy ratio (Ea/Ee) | | 0.69 | 1.17 | 1.92 | 0 | — | 1.17 | 1.17 |
| Equivalent of NCO per hydroxyl group | | 1.05 | 1.05 | 1.05 | 1.05 | 1.05 | 0.95 | 1.15 |
| Evaluation results | one day after aging | Thermal conductivity (W/mK) | 0.0169 | 0.0169 | 0.0170 | 0.0180 | 0.0185 | 0.0170 | 0.0180 |
|  |  | Gas composition (%) $CO_2$ | 5 | 5 | 5 | 25 | 50 | 5 | 25 |
|  |  | CP | 95 | 95 | 95 | 75 | 50 | 95 | 75 |
|  | one week after aging | Thermal conductivity (W/mK) | 0.0170 | 0.0169 | 0.0169 | 0.0170 | 0.0175 | 0.0170 | 0.0170 |
|  |  | Gas composition (%) $CO_2$ | 5 | 5 | 5 | 5 | 25 | 5 | 5 |
|  |  | CP | 95 | 95 | 95 | 95 | 75 | 95 | 95 |
|  | Expansion amount of thermal insulating cabinet | | <3 mm | <3 mm | <3 mm | <3 mm | <3 mm | 5–7 mm | <3 mm |

As is apparent from a comparison shown in Table 4, it becomes possible to rapidly fix carbon dioxide remaining inside the closed cells and to increase the ratio of cyclopentane as the volatile blowing agent without increasing the resin thermal conductivity of the polyurethane foamed material by using a mixture of glycidylamines and glycidyl ethers as epoxides, thereby to obtain a thermal insulating foamed material having an excellent thermal insulating property. It is also possible to rapidly develop the mechanical strength of the thermal insulating foamed material, thereby to improve the productivity.

In Comparative Example 5-1, it was possible to finally improve to the same property as that of Comparative Example 7 in the same manner as in Example 3-1, but the productivity was drastically deteriorated.

In Comparative Example 5-2, the productivity was drastically deteriorated in the same manner as in Comparative Example 3-2.

In Comparative Example 5-3, the appearance and quality of the thermal insulating cabinet were drastically deteriorated in the same manner as in Comparative Example 3-3.

In Comparative Example 5-4, the productivity was drastically deteriorated in the same manner as in Comparative Example 3-4.

EXAMPLE 8

A polyol composition comprising 100 parts by weight of polyether polyol having a hydroxyl group value of 500 (mg KOH/g), 1 part of a urethane reaction catalyst, 3 parts of a foam stabilizer, 15 parts of HFC245fa as the volatile blowing agent and 1 part of a mixture of water and formic acid as the reactive blowing agent was prepared.

Epoxides for fixing carbon dioxide were obtained by mixing 4 parts of 1,2-butylene oxide (epoxy equivalent: 72) as the epoxide compound having low reactivity with carbon dioxide and low reactivity with polyisocyanate, 7.9 parts of glycidyl methacrylate (epoxy equivalent: 142) and 6 parts of neopentyl glycol glycidyl ether (epoxy equivalent: 108) as the epoxide compounds having a boiling point of more than 120° C. The molar amount of the epoxy group of glycidyl methacrylate and neopentyl glycol diglycidyl ether per mol of the epoxy group of 1,2-butylene oxide is about one mol, respectively. The total amount of epoxides corresponds to the amount containing the epoxy group of about 3 mol per mol (stoichiometric amount) of carbon dioxide evolving at the time of blowing.

Then, the epoxides were mixed with 15 parts of brominated tetrabutylammonium as the carbon dioxide fixation catalyst. This mixed solution, the above-mentioned polyol composition and 133 parts of polyisocyanate were mixed with stirring and the mixture was injected into the space part of a container produced by combining an inner liner with an outer shell and blown.

Comparative Example 6

As epoxides for fixing carbon dioxide, a mixture of glycidyl methacrylate and neopentyl glycol diglycidyl ether was used. The amount of the epoxides added corresponds to the amount containing the epoxy group of about 3 mol per mol (stoichiometric amount) of carbon dioxide evolving at the time of blowing. A thermal insulating cabinet was prepared in the same manner as in Example 8 except for the above-mentioned conditions.

The filling state of the thermal insulating foamed material into the thermal insulating cabinet was good in Example 8 and Comparative Example 6. One day after blowing, the endotherm of the thermal insulating cabinet of Example 8 and that of Comparative Example 6 was measured, and the thermal insulating property was evaluated. As a result, the thermal insulating property of both thermal insulating cabinets were superior by about 5% to that of the thermal insulating cabinets prepared by adding no epoxides. The thermal insulating property of the thermal insulating cabinet of Comparative Example 6 was improved by only about 2% with a time lapse, while the thermal insulating property was improved by about 5% in Example 8.

The thermal insulating foamed material was analyzed. As a result, it was found that 1,2-butylene oxide having a boiling point of 63° C. was vaporized at the time of blowing in Example 8 and, therefore, the side reaction between it and polyisocyanate was inhibited. It was also found that after the fixation of carbon dioxide by glycidyl methacrylate and neopentyl glycol diglycidyl ether, 1,2-butylene oxide causes the carbon dioxide fixation catalyst which exists in the foamed material to fix carbon dioxide in the closed cells, thereby to form a carbonate and, therefore, the thermal insulating property is improved with a time lapse.

INDUSTRIAL APPLICABILITY

As described above, according to the present invention, it is possible to obtain a thermal insulating foamed material, which is superior in thermal insulating property because of decreased amount of carbon dioxide in closed cells and does not cause deterioration of the thermal insulating property with a time lapse. According to the present invention, carbon dioxide inside the closed cells is rapidly fixed in the production step and, therefore, a vapor thermal conductivity is improved, thereby to improve the thermal insulating property of a thermal insulating foamed material. At the same time, a mechanical strength of the thermal insulating foamed material is rapidly developed and, therefore, productivity is also excellent.

We claim:

1. A thermal insulating foamed material comprising a foamed urethane resin composition having closed cells, said foamed urethane resin composition containing a carbon dioxide fixation catalyst and cyclic carbonate compounds as products of reactions between carbon dioxide and epoxides in the presence of said carbon dioxide fixation catalyst, said cyclic carbonate compounds comprising at least two members of a reaction product of an epoxide compound, having high reactivity with carbon dioxide, and carbon dioxide and a reaction product of an epoxide compound, having low reactivity with carbon dioxide, and carbon dioxide.

2. The thermal insulating foamed material in accordance with claim 1, wherein said epoxide compound having high reactivity with carbon dioxide is an epoxide complex in which said carbon dioxide fixation catalyst is coordinated to an oxirane ring.

3. The thermal insulating foamed material in accordance with claim 2, wherein said epoxide compound having high reactivity with carbon dioxide is an epoxide complex in which said carbon dioxide fixation catalyst is coordinated to an alkylene oxide, and said epoxide compound having low reactivity with carbon dioxide is an alkylene oxide.

4. The thermal insulating foamed material in accordance with claim 2, wherein said epoxide compound having high reactivity with carbon dioxide is an epoxide complex in which said carbon dioxide fixation catalyst is coordinated to an alkylene oxide, and said epoxide compound having low reactivity with carbon dioxide comprises an alkylene oxide and a glycidyl ether.

5. The thermal insulating foamed material in accordance with claim 1, wherein said epoxides contain an epoxide compound having high reactivity with polyisocyanate and an epoxide compound having low reactivity with polyisocyanate, and said epoxide compound having low reactivity with carbon dioxide is an epoxide compound having high reactivity with polyisocyanate.

6. The thermal insulating foamed material in accordance with claim 5, wherein said epoxide compound having high reactivity with polyisocyanate is a polyglycidyl ether having two or more epoxy groups, and said epoxide compound having low reactivity with polyisocyanate is a monoglycidyl ether having one epoxy group.

7. The thermal insulating foamed material in accordance with claim 5, wherein said epoxide compound having high reactivity with polyisocyanate is a polyglycidyl ether having at least one hydroxyl group, and said epoxide compound having low reactivity with polyisocyanate is a glycidyl ether having no hydroxyl group.

8. The thermal insulating foamed material in accordance with claim 5, wherein said epoxide compound having high reactivity with polyisocyanate is a polyglycidylamine, and said epoxide compound having low reactivity with polyisocyanate is a glycidyl ether.

9. The thermal insulating foamed material in accordance with claim 1, wherein said epoxides contain an epoxide compound having a boiling point of more than 120° C. and an epoxide compound having low reactivity with polyisocyanate and a boiling point of 120° C. or less, and said epoxide compound having low reactivity with carbon dioxide is an epoxide compound having low reactivity with polyisocyanate.

10. The thermal insulating foamed material in accordance with claim 9, wherein said epoxide compound having a boiling point of more than 120° C. is a glycidyl ether, a glycidyl ester or a glycidylamine, and said epoxide compound having a boiling point of 120° C. or less is an alkylene oxide.

11. A method for producing a thermal insulating foamed material, which comprises the steps of:

blowing a raw material mixture containing epoxides comprising at least two members of an epoxide compound having high reactivity with carbon dioxide and an epoxide compound having low reactivity with carbon dioxide, a carbon dioxide fixation catalyst, polyisocyanate, a reactive blowing agent which evolves carbon dioxide by reacting with said polyisocyanate, and a polyol composition, thereby to form a foamed polyurethane resin composition having closed cells in which at least carbon dioxide is filled, and allowing said carbon dioxide in said closed cells to react with said epoxides in the presence of said carbon dioxide fixation catalyst, thereby to fix carbon dioxide as carbonate compounds.

12. The method for producing a thermal insulating foamed material in accordance with claim 11, wherein said raw material mixture further comprises a volatile blowing agent.

13. The method for producing a thermal insulating foamed material in accordance with claim 11, wherein said epoxides have an epoxy group of 1 to 6 mol per mol (stoichiometric amount) of said carbon dioxide evolving by the reaction between said polyisocyanate and said reactive blowing agent.

14. The method for producing a thermal insulating foamed material in accordance with claim 11, wherein said polyisocyanate has an isocyanate group whose molar amount is the same as that of a hydroxyl group in said raw material mixture, and has an isocyanate group which reacts with 0 to 50% of said epoxy group of said epoxides.

15. The method for producing a thermal insulating foamed material in accordance with claim 11, wherein said epoxide compound having high reactivity with carbon dioxide is an epoxide complex in which said carbon dioxide fixation catalyst is coordinated to an oxirane ring.

16. The method for producing a thermal insulating foamed material in accordance with claim 15, wherein a ratio of a molar amount of an epoxy group of said epoxide complex to a molar amount of an epoxy group of said epoxide compound having low reactivity with carbon dioxide is from 0.01 to 1.0.

17. The method for producing a thermal insulating foamed material in accordance with claim 16, wherein said epoxide compound having high reactivity with carbon dioxide is an epoxide complex in which said carbon dioxide fixation catalyst is coordinated to an alkylene oxide, and said epoxide compound having low reactivity with carbon dioxide is an alkylene oxide.

18. The method for producing a thermal insulating foamed material in accordance with claim 16, wherein said epoxide compound having high reactivity with carbon dioxide is an epoxide complex in which said carbon dioxide fixation catalyst is coordinated to an alkylene oxide, and said epoxide compound having low reactivity with carbon dioxide comprises an alkylene oxide and a glycidyl ether.

19. The method for producing a thermal insulating foamed material in accordance with claim 11, wherein said epoxides contain an epoxide compound having high reactivity with polyisocyanate and an epoxide compound having low reactivity with polyisocyanate, and said epoxide compound having low reactivity with carbon dioxide is an epoxide compound having high reactivity with polyisocyanate.

20. The method for producing a thermal insulating foamed material in accordance with claim 19, wherein a ratio of a molar amount of an epoxy group of said epoxide compound having high reactivity with polyisocyanate to a molar amount of an epoxy group of said epoxide compound having low reactivity with polyisocyanate is from 0.50 to 2.0.

21. The method for producing a thermal insulating foamed material in accordance with claim 20, wherein said epoxide compound having high reactivity with polyisocyanate is a polyglycidyl ether having two or more epoxy groups, and said epoxide compound having low reactivity with polyisocyanate is a monoglycidyl ether having one epoxy group.

22. The method for producing a thermal insulating foamed material in accordance with claim 20, wherein said epoxide compound having high reactivity with polyisocyanate is a glycidyl ether having at least one hydroxyl group, and said epoxide compound having low reactivity with polyisocyanate is a glycidyl ether having no hydroxyl group.

23. The method for producing a thermal insulating foamed material in accordance with claim 20, wherein said epoxide compound having high reactivity with polyisocyanate is a polyglycidylamine, and said epoxide compound having low reactivity with polyisocyanate is a glycidyl ether.

24. The method for producing a thermal insulating foamed material in accordance with claim 11, wherein said epoxides contain an epoxide compound having a boiling point of more than 120° C. and an epoxide compound having low reactivity with polyisocyanate and a boiling point of 120° C. or less, and said epoxide compound having low reactivity with carbon dioxide is an epoxide compound having low reactivity with polyisocyanate and a boiling point of 120° C. or less and, further, a ratio of a molar amount of an epoxy group of said epoxide compound having a boiling point of more than 120° C. to a molar amount of an epoxy group of said epoxide compound having a boiling point of 120° C. or less is from 0.20 to 2.0.

25. The method for producing a thermal insulating foamed material in accordance with claim 24, wherein said epoxide compound having a boiling point of more than 120° C. is a glycidyl ether, a glycidyl ester or a glycidylamine, and said epoxide compound having a boiling point of 120° C. or less is an alkylene oxide.

26. A thermal insulating cabinet comprising an outer shell, an inner liner and a thermal insulating foamed material filled in the space part formed by said outer shell and said inner liner, said thermal insulating foamed material comprising a foamed urethane resin composition having closed cells, said foamed urethane resin composition containing a carbon dioxide fixation catalyst and cyclic carbonate compounds as products of reactions between carbon dioxide and epoxides in the presence of said carbon dioxide fixation catalyst, said cyclic carbonate compounds comprising at least two members of a reaction product of an epoxide compound having high reactivity with carbon dioxide and carbon dioxide and a reaction product of an epoxide compound having low reactivity with carbon dioxide and carbon dioxide.

* * * * *